US005482310A

United States Patent [19]
Staggs

[11] Patent Number: 5,482,310
[45] Date of Patent: Jan. 9, 1996

[54] TRAILER HITCH MIRROR ALIGNMENT DEVICE

[76] Inventor: Jimmy L. Staggs, 133 W. 6th St., Krum, Tex. 76249

[21] Appl. No.: 359,570

[22] Filed: Dec. 20, 1994

[51] Int. Cl.$^6$ ..................................................... B60D 1/40
[52] U.S. Cl. .......................... 280/477; 359/841; 359/872; 359/881; 248/467
[58] Field of Search ........................... 280/477; 359/841, 359/843, 844, 872, 871, 881, 903; 248/467; 33/264

[56] References Cited

U.S. PATENT DOCUMENTS

| | | | |
|---|---|---|---|
| 3,524,701 | 8/1970 | Strohmeier | 280/477 X |
| 3,767,292 | 10/1973 | Rutkowski | 359/871 |
| 3,858,966 | 1/1975 | Lowell, Jr. | 280/477 X |
| 4,163,606 | 8/1979 | Granno | 359/881 |
| 4,905,376 | 3/1990 | Neeley | 280/477 X |
| 4,925,287 | 5/1990 | Lord et al. | 359/872 |
| 4,951,913 | 8/1990 | Quesada | 359/844 X |
| 5,111,342 | 5/1992 | Quesada | 359/872 |
| 5,180,182 | 1/1993 | Haworth | 280/477 |
| 5,235,468 | 8/1993 | Stephens | 359/841 |
| 5,309,289 | 5/1994 | Johnson | 280/477 X |

FOREIGN PATENT DOCUMENTS

| | | | |
|---|---|---|---|
| 951554 | 8/1971 | Canada | 280/477 |
| 2601527 | 7/1977 | Germany | 280/477 |

Primary Examiner—Kevin T. Hurley

[57] ABSTRACT

A trailer hitch mirror alignment device including a mounting bracket; a pair of space rigid linear telescopically adjustable legs, each leg having an upper end and a lower end and with the lower ends of the legs pivotally and adjustably coupled to the mounting bracket; a mirror pivotally and adjustably coupled between the upper ends of the legs; and a magnet coupled to the mounting bracket and removably securable to a recipient metal surface, particularly a rear of a vehicle with a hitch coupled thereto, with the mirror positionable such that an image of the hitch and surrounding area is provided to a driver of the vehicle, thereby facilitating the positioning of the hitch by the driver in alignment with a hitch on an associated trailer.

5 Claims, 4 Drawing Sheets

TRAILER HITCH MIRROR ALIGNMENT DEVICE

BACKGROUND OF THE INVENTION

1. Field of the Invention

The present invention relates to a trailer hitch mirror alignment device and more particularly pertains to assisting a driver of a vehicle in securing a hitch of a trailer to a hitch on the vehicle with a trailer hitch mirror alignment device.

2. Description of the Prior Art

The use of trailer hitch alignment assemblies is known in the prior art. More specifically, trailer hitch alignment assemblies heretofore devised and utilized for the purpose of hitching a vehicle with a trailer are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 340,219 to Moon discloses a trailer hitch mirror. U.S. Pat. No. 5,111,342 to Quesada discloses a hitch-viewing mirror assembly employing suction cups and tip rests for use on towing vehicle. U.S. Pat. No. 5,113,588 to Walston discloses an isomorphic trailer hitch alignment guide device. U.S. Pat. No. 5,180,182 to Haworth discloses a trailer hitch alignment device. U.S. Pat. No. 5,235,648 to Stephens discloses a trailer hitch viewing device with a readily detachable, fixed alignment and storable mirror.

While these devices fulfill their respective, particular objective and requirements, the aforementioned patents do not describe a trailer hitch mirror alignment device that incorporates magnetic coupling for ready attachment to all types of vehicles without the need of special hardware and without damaging a vehicle's finish.

In this respect, the trailer hitch mirror alignment device according to the present invention substantially departs from the conventional concepts and designs of the prior art, and in doing so provides an apparatus primarily developed for the purpose of assisting a driver of a vehicle in securing a hitch of a trailer to a hitch on the vehicle.

Therefore, it can be appreciated that there exists a continuing need for new and improved trailer hitch mirror alignment device which can be used for assisting a driver of a vehicle in securing a hitch of a trailer to a hitch on the vehicle. In this regard, the present invention substantially fulfills this need.

SUMMARY OF THE INVENTION

In the view of the foregoing disadvantages inherent in the known types of trailer hitch alignment assemblies now present in the prior art, the present invention provides an improved trailer hitch mirror alignment device. As such, the general purpose of the present invention, which will be described subsequently in greater detail, is to provide a new and improved trailer hitch mirror alignment device and method which has all the advantages of the prior art and none of the disadvantages.

To attain this, the present invention essentially comprises, in combination, a rigid metal mounting bracket including a rectangular planar base plate having a front surface, a back surface, and a periphery interconnecting the front surface with the back surface formed of a top edge, a bottom edge, and opposed side edges. The mounting bracket further includes a pair of opposed spaced rectangular vertical coupling plates integral with the upper surface of the base plate and extended perpendicularly outwards therefrom. A pair of rigid linear metal lower legs are included with each lower leg having a slot formed longitudinally thereon with the slot thereby creating a C-shaped cross-section for the lower leg, a sealed and rounded lower base end, an open upper tip end, and a plurality of spaced through holes disposed thereon between the tip end and base end. Each lower leg has its base end pivotally and adjustably secured to a separate coupling plate of the mounting bracket. A pair of rigid linear metal upper legs are included with each upper leg having a rectangular cross-section, an upper end, a lower end telescopically and adjustably received within a separate slot of the lower leg, and a plurality of spaced thorough holes disposed thereon between the tip end and base end and with each through hole separately alignable with a through hole of the adjacent lower leg. Pin securement means formed of bolts and thumbscrews are extended through aligned through holes of the upper rail and lower rail for setting the extension of the tip end of the upper leg from the tip end of the lower leg. A rectangular mirror is included and has a reflective planar sheet with a front surface and a back surface and a rigid planar rectangular metal backing secured against the back surface. The backing further includes a periphery formed of a pair of opposed long edges with a pair of short edges extended therebetween. The mirror also has pair of opposed spaced rectangular metal coupling plates integral with the backing and extended perpendicularly outwards therefrom and with each coupling plate pivotally adjustably coupled to a separate upper end of an upper leg. Lastly, a rectangular magnet is included and has a front surface, a back surface coupled to the back surface of the base plate of the mounting bracket, and a periphery interconnecting the front surface with the back surface formed of a long top edge, a long bottom edge, and short opposed side edges extended therebetween. The front surface of the magnet further has a plurality of spaced parallel grooves formed thereon with each groove extended between the side edges to thereby create a plurality of teeth. The side edges of the magnet are pivotally and adjustably coupled to the lower ends of the lower legs. The teeth of the magnet are removably securable to a recipient metal surface, particularly a rear of a vehicle with a hitch coupled thereto, with the mirror positionable such that an image of the hitch and surrounding area is provided to a driver of the vehicle, thereby facilitating the positioning of the hitch by the driver in alignment with a hitch on an associated trailer.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trailer hitch mirror alignment device which has all the advantages of the prior art trailer hitch alignment assemblies and none of the disadvantages.

It is another object of the present invention to provide a new and improved trailer hitch mirror alignment device which may be easily and efficiently manufactured and marketed.

It is a further object of the present invention to provide a new and improved trailer hitch mirror alignment device which is of durable and reliable construction.

An even further object of the present invention is to provide a new and improved trailer hitch mirror alignment device which is susceptible of a low cost of manufacture with regard to both materials and labor, and which accordingly is then susceptible of low prices of sale to the consuming public, thereby making such a trailer hitch mirror alignment device economically available to the buying public.

Still yet another object of the present invention is to provide a new and improved trailer hitch mirror alignment device which provides in the apparatuses and methods of the prior art some of the advantages thereof, while simultaneously overcoming some of the disadvantages normally associated therewith.

Even still another object of the present invention is to provide a new and improved trailer hitch mirror alignment device comprising a mounting bracket; a pair of spaced rigid linear telescopically adjustable legs with each leg having an upper end and a lower end and with the lower ends thereof pivotally and adjustably coupled to the mounting bracket; a mirror pivotally and adjustably coupled between the upper ends of the legs; and a magnet coupled to the mounting bracket and removably securable to a recipient metal surface, particularly a rear of a vehicle with a hitch coupled thereto, with the mirror positionable such that an image of the hitch and surrounding area is provided to a driver of the vehicle, thereby facilitating the positioning of the hitch by the driver in alignment with a hitch on an associated trailer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
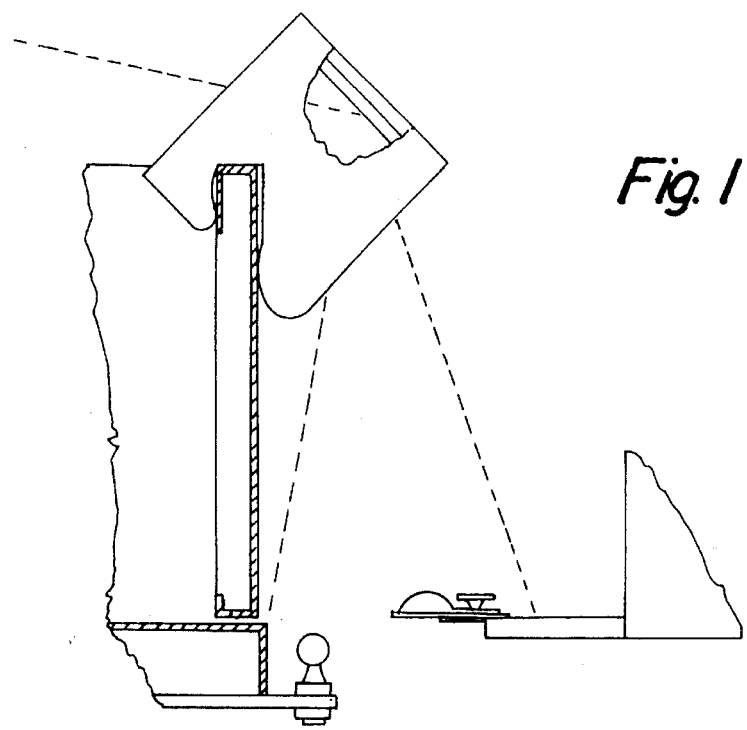
FIG. 1 is a side-elevational view of a prior art trailer hitch alignment device.
Figure 2:
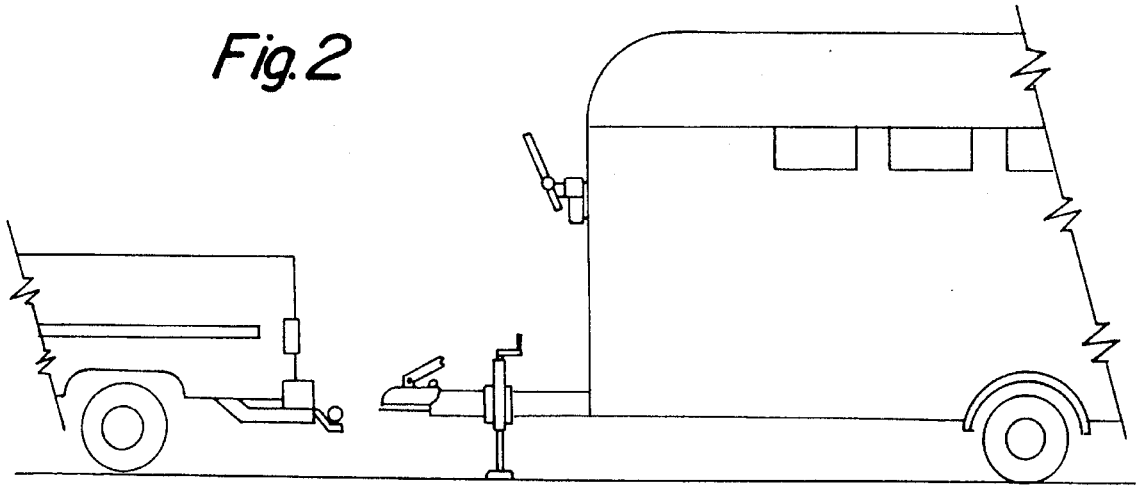
FIG. 2 is a side-elevational view of yet another prior art trailer hitch alignment device.
Figure 3:
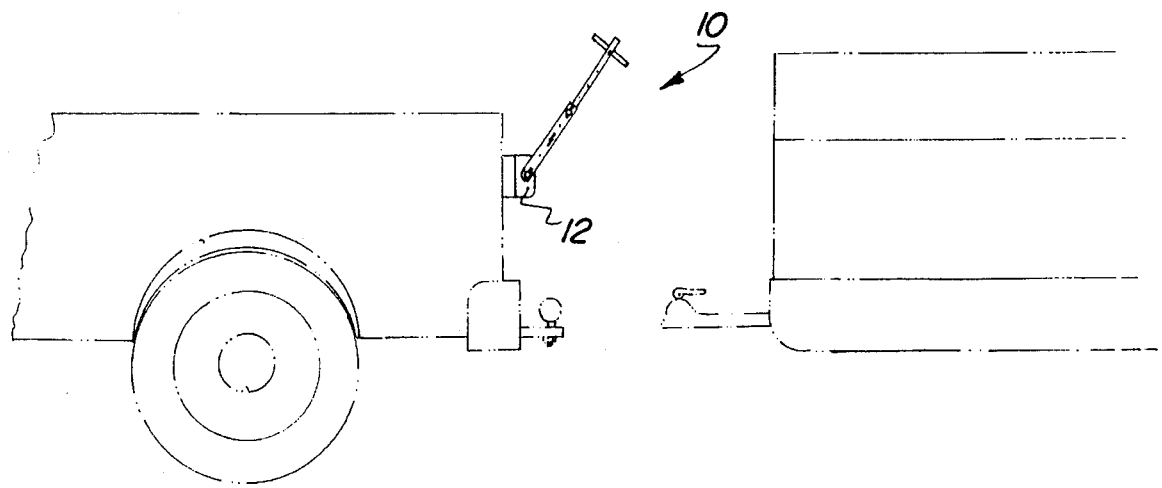
FIG. 3 is a side-elevational view of the preferred embodiment constructed in accordance with the principles of the present invention secured to a rear of a vehicle in a position for allowing alignment of a hitch on the vehicle with a hitch of an associated trailer.
Figure 4:
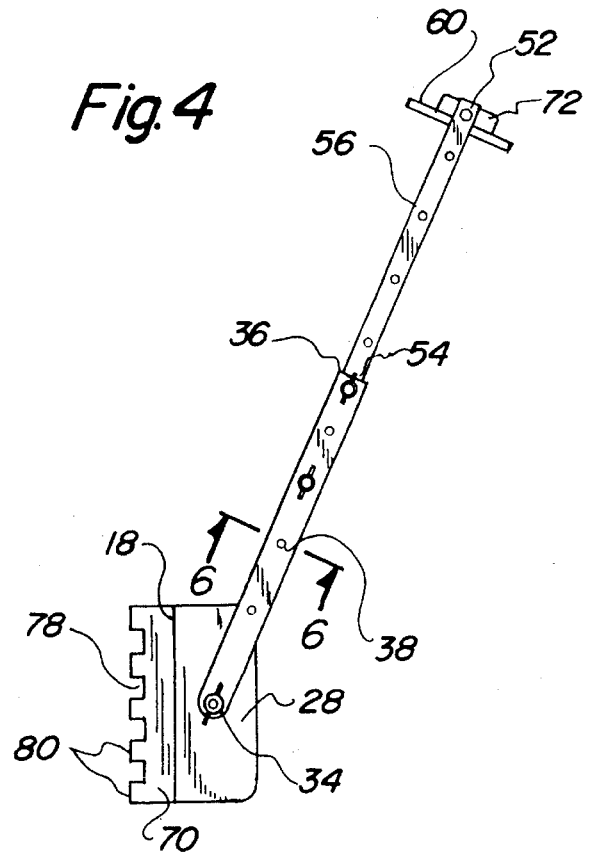
FIG. 4 is an enlarged side-elevational view of the present invention.
Figure 5:
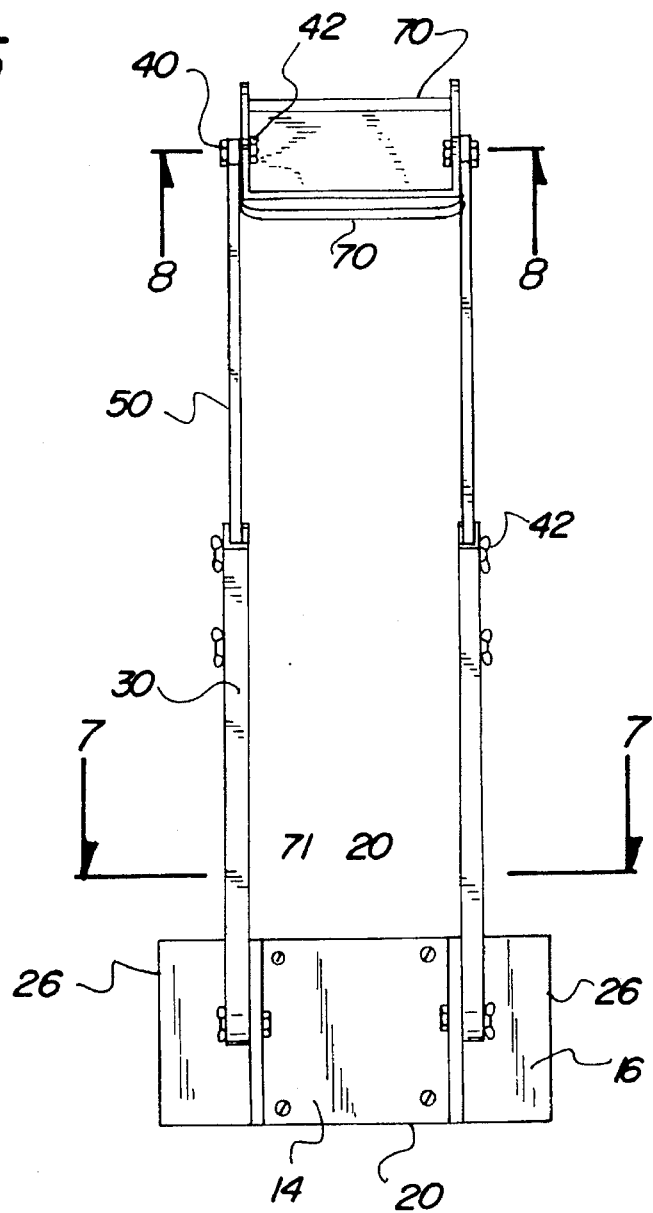
FIG. 5 is another side-elevational view of the present invention.
Figure 6:
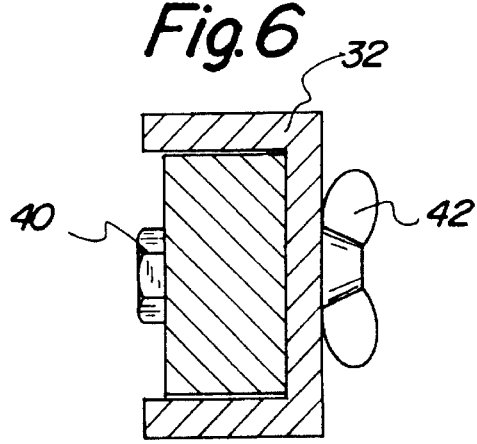
FIG. 6 is a cross-sectional view of the present invention taken along the line 6—6 of FIG. 4.
Figure 7:
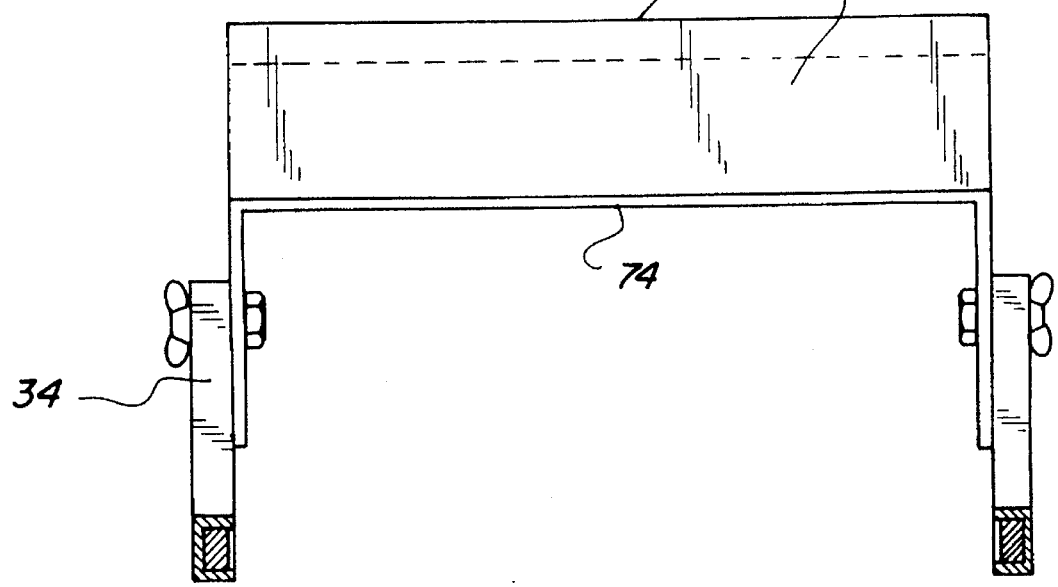
FIG. 7 is an enlarged view of the mirror of the present invention as previously shown in FIG. 5.
Figure 8:
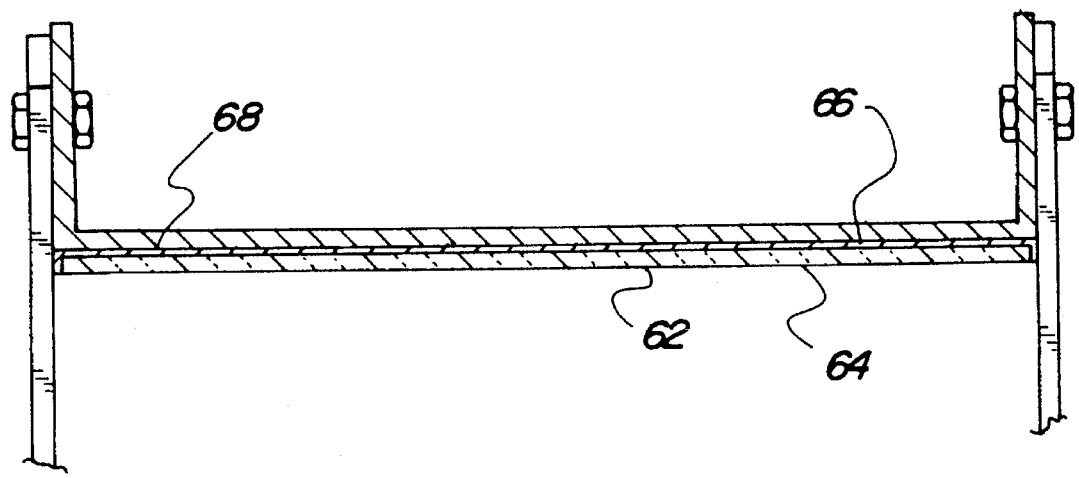
FIG. 8 is a cross-sectional view of the mirror of the present invention.

With reference now to the drawings, and in particular, to FIG. 1 thereof, the preferred embodiment of the new and improved trailer hitch mirror alignment device embodying the principles and concepts of the present invention and generally designated by the reference number 10 will be described.

The present invention is comprised of a plurality of components. In their broadest context, such components include a mounting bracket, legs, mirror and magnet. Such components are individually configured and correlated with respect to each other to provide the intended function of assisting a driver of a vehicle in securing a hitch of a trailer to a hitch on the vehicle.

Specifically, the present invention includes a mounting bracket 12. The mounting bracket is rigid in structure and formed of metal. The mounting bracket includes a rectangular vertical planar base plate 14. The base plate has a front surface 16, a back surface 18, and a periphery interconnecting the front surface with the back surface. The periphery is formed of a top edge 20, a bottom edge 22, and opposed side edges 26. The mounting bracket also includes a pair of opposed, spaced, and coplanar coupling plates 28. Each plate has a rectangular shape. Each coupling plate is integral with the upper surface of the base plate and extended perpendicularly outwards therefrom. Each coupling plate also has a mounting hole disposed centrally therethrough.

The present invention includes a pair of lower legs 30. The lower legs are rigid and straight in structure. Each lower leg is formed of metal. Each lower leg further has a slot 32 formed longitudinally thereon. The slot thereby creates a C-shaped cross-section for the lower leg. Each lower leg has a rounded and sealed lower base end 34 with a mounting hole disposed therethrough. Each lower leg also includes an open upper tip end 36 and a plurality of spaced through holes 38 disposed longitudinally in sequence thereon between the tip end and the base end thereof. Each lower leg has its base end pivotally and adjustably secured to a separate coupling plate of the mounting bracket. The coupling is performed with a bolt 40 extended through the mounting holes of the lower base end and the coupling plate and then secured with a complimentary thumb screw 42. By loosening the thumb screws, the angular orientation of the lower legs with respect to the mounting bracket can be adjusted. By tightening the thumb screws, the angular orientation of the lower legs with respect to the mounting bracket is set.

The present invention also includes a pair of upper legs 50. The upper legs are rigid and straight in structure. Each upper leg is formed of metal. Each upper leg also has a rectangular cross-section, an upper end 52, and a lower end 54. The lower end is telescopically and adjustably received within a separate slot of the lower leg through the upper tip 36 end thereof. Each upper leg also includes a plurality of spaced through holes 56 disposed longitudinally and in sequence thereon between the tip end and the base end thereof. Each through hole is separately alignable with a through hole of the associated adjacent lower leg. Each upper leg additionally has a mounting hole formed therethrough at its upper end.

The upper legs are secured to the lower legs with two pairs of bolts 40 with complimentary thumb screws 42. Two bolts are extended through aligned through holes of each pair of mated legs to set the extension of the tip end of the upper leg from the tip end of the lower leg. The mated legs are then secured in a stationary configuration with a pair of complimentary wing nuts 42. To adjust the extension of the upper legs from the lower legs, the wing nuts and bolts are removed and then re-secured at the desired locations.

A rectangular mirror 60 is also provided. The mirror has a rectangular planar sheet 62 with a front surface 64 and a back surface 66. The sheet is formed of a glass material with a silver backing. Also provided is a rigid planar rectangular metal backing 68 secured against the back surface of the sheet. The backing has a periphery formed of a pair of opposed long edges 70 with a pair of short edges extended therebetween. The mirror further includes a pair of opposed and spaced rectangular metal coupling plates 72. The coupling plates are integral with the backing and extended perpendicularly outwards therefrom at a opposite the sheet of glass to thereby create a generally U-shaped configuration. Each coupling plate is aligned in parallel with the short edges of the mirror. Each coupling plate also has a mounting hole disposed centrally therethrough. The coupling plates are pivotally and adjustably coupled to the upper ends of the upper legs. This coupling is performed with a bolt 40 extended through the upper end of each upper leg and through the mounting hole of a separate coupling plate. The bolts are then secured with complimentary wing nuts 42. When the wing nuts are loosened, the angular orientation of the mirror is adjustable. When the wing nuts are tightened, the angular orientation of the mirror is set.

Lastly, a rectangular metal magnet 70 is provided. The magnet has a front surface, a back surface coupled to the back surface 18 of the base plate on the mounting bracket, and a periphery interconnecting the upper surface with the lower surface. The back surface of the magnet is coupled to the back surface of the base plate. This coupling is performed with four screws 71. The periphery of the magnet is formed of a long top edge 72, a long bottom edge 74 and short opposed side edges 76. The lower surface of the magnet further has a plurality of spaced and parallel grooves 78 formed thereon. Each groove is extended between the side edges to thereby create a plurality of teeth 80. The tops of the teeth are polished smooth so that they do not scratch a metal surface when secured thereto. The teeth of the magnet are removably secured to a recipient metal surface, particularly a rear of a vehicle with a hitch coupled thereto. The teeth allow the magnet to maintain its grip on the vehicle's metal surface, even if it is a bit rough. The mirror is then positionable such that an image of the hitch on the vehicle and the nearby surrounding area is provided to a driver of the vehicle. This arrangement thereby facilitates the ready positioning of the hitch on the vehicle in alignment with a hitch on an associated trailer as a driver backs the vehicle towards the trailer.

The present invention uses a pivotable mirror mounted on two sliding legs. The present invention is designed to assist a driver when hitching a trailer to a car or truck. The present invention consists of 2 adjustable legs, 8 wing nuts, a magnet, a mounting bracket and a mirror. Each leg is made in 2 pieces of aluminum or plastic with are held together by two wing nuts. The legs extend to a maximum length of about 8 inches to 12 inches. A magnet, which is approximately 6 inches long, is mounted between the legs at one end with 2 or more wing nuts. The remaining 2 wing nuts are used to mount the mirror between the legs. The mirror is about 6¼ inches long and about 4½ inches wide.

To use the present invention, the magnet is secured to a tailgate or trunk of a truck or car. The legs and mirror are then adjusted to a position such that the trailer hitch on the vehicle and associated surrounding area can be viewed in the mirror while a driver sits in a driver's seat of a vehicle. The vehicle can then be backed up to a trailer until it is proximally positioned to the trailer's hitch; now, the trailer can be hooked to the hitch of the vehicle. The present invention can now be removed.

The present invention eliminates the need for a second person to stand behind a vehicle and direct the driver. The mirror incorporates a scratch resistant face on the magnet that prevents damaging a vehicle's finish. With this mirror, the driver can back up correctly without having to jockey back and forth or get in and out of a vehicle. The image provided by the mirror is not distorted in any fashion.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A trailer hitch mirror alignment device for assisting a driver of a vehicle in securing a hitch of a trailer to a hitch on the vehicle comprising, in combination:

a rigid metal mounting bracket including a rectangular planar base plate having a front surface, a back surface, and a periphery interconnecting the front surface with the back surface formed of a top edge, a bottom edge, and opposed side edges, the mounting bracket further including a pair of opposed spaced rectangular vertical coupling plates integral with the upper surface of the base plate and extended perpendicularly outwards therefrom;

a pair of rigid linear metal lower legs, each lower leg having a slot formed longitudinally thereon with the slot thereby creating a C-shaped cross-section, a sealed and rounded lower base end, an open upper tip end, and a plurality of spaced through holes disposed thereon between the tip end and base end, each lower leg having its base end pivotally and adjustably secured to a separate coupling plate of the mounting bracket;

a pair of rigid linear metal upper legs, each upper leg having a rectangular cross-section, an upper end, a lower end telescopically and adjustably received within a separate slot of the lower leg, and a plurality of spaced through holes disposed thereon between the tip end and base end and with each through hole separately alignable with a through hole of the adjacent lower leg;

pin securement means extended through aligned through holes of the upper rail and lower rail for setting the extension of the tip end of the upper leg from the tip end of the lower leg;

a rectangular mirror having a reflective planar sheet with a front surface and a back surface and a rigid planar rectangular metal backing secured against the back surface, the backing further having a periphery formed of a pair of opposed long edges with a pair of short edges extended therebetween, the mirror further including pair of opposed spaced rectangular metal coupling plates integral with the backing and extended perpendicularly outwards therefrom and with each coupling plate pivotally adjustably coupled to a separate upper end of an upper leg; and a rectangular magnet having an upper surface, a lower surface coupled to the back surface of the base plate of the mounting bracket, and a periphery interconnecting the upper surface with the lower surface formed of a long top edge, a long bottom edge, and short opposed side edges, the lower surface thereof further having a plurality of spaced parallel grooves formed thereon with each groove extended between the side edges to thereby create a plurality of teeth, the side edges of the magnet pivotally and adjustably coupled to the lower ends of the lower legs, the teeth of the magnet removably securable to a recipient metal surface, particularly a rear of a vehicle with a hitch coupled thereto, with the mirror positionable such that an image of the hitch and surrounding area is provided to a driver of the vehicle, thereby facilitating the positioning of the hitch by the driver in alignment with a hitch on an associated trailer.

2. A trailer hitch mirror alignment device comprising:

a mounting bracket;

a pair of spaced rigid linear telescopically adjustable legs, each leg having an upper end and a lower end with the lower ends thereof pivotally and adjustably coupled to the mounting bracket;

a mirror pivotally and adjustably coupled between the upper end of the legs; and a magnet coupled to the mounting bracket and removably securable to a recipient metal surface, particularly a rear of a vehicle with a hitch coupled thereto, with the mirror positionable such that an image of the hitch and surrounding area is provided to a driver of the vehicle, thereby facilitating the positioning of the hitch by the driver in alignment with a hitch on an associated trailer.

3. The trailer hitch mirror alignment device as set forth in claim 2 wherein each leg further comprises:

a lower leg having a slot formed longitudinally thereon with the slot thereby creating a C-shaped cross-section, a sealed and rounded lower base end, an open upper tip end, and a plurality of spaced through holes disposed thereon between the tip end and base end;

an upper leg having a rectangular cross-section, an upper end; a lower end telescopically and adjustably received within a separate slot of the lower leg, and a plurality of spaced through holes disposed thereon between the tip end and base end and with each through hole separately alignable with a through hole of the adjacent lower leg; and pin securement means extended through aligned through holes of the upper rail and lower rail for setting the extension of the tip end of the upper leg from the tip end of the lower leg.

4. The trailer hitch mirror alignment device as set forth in claim 2 wherein the mirror is rectangular and has a width of 4½ inches and a length of 6½ inches.

5. The trailer hitch mirror alignment device as set forth in claim 2 wherein each leg is extendable to a maximum length of between about 8 inches to 12 inches.

* * * * *